Oct. 18, 1949.  J. S. KOMASSA  2,485,385
REEL

Filed Aug. 13, 1945  2 Sheets-Sheet 1

INVENTOR
JEROME S. KOMASSA
BY
Wheeler, Wheeler & Wheeler
ATTORNEYS.

Oct. 18, 1949. J. S. KOMASSA 2,485,385
REEL
Filed Aug. 13, 1945 2 Sheets-Sheet 2

INVENTOR
JEROME S. KOMASSA
BY
Wheeler, Wheeler & Wheeler
ATTORNEYS

Patented Oct. 18, 1949

2,485,385

UNITED STATES PATENT OFFICE 2,485,385

REEL

Jerome S. Komassa, Milwaukee, Wis., assignor, by mesne assignments, to Rodger F. Becker, Kalamazoo, Mich.

Application August 13, 1945, Serial No. 610,501

8 Claims. (Cl. 242—102)

This invention relates to improvements in reels.

It is a primary object of the invention to provide a novel and compact organization using a number of conventional spring assemblies in series to provide for the re-winding of a very substantial length of clothesline, lamp cord or the like.

My improved reel is particularly adapted to be used as a clothesline reel on which a clothesline may be left permanently stored with protection from the weather, both for the line and for the operating mechanism.

It is a further object of the invention to provide a device of this character in which the reel may be positively locked in any position of adjustment and will further be checked or locked automatically if its re-winding speed becomes excessive.

More specifically, it is one of the objects of the invention to provide a desirable mounting for the reel and its actuating connections, as will more fully appear from the following disclosure of the invention.

In the drawings.

Like parts are designated by the same reference characters throughout the application.

Figure 1:
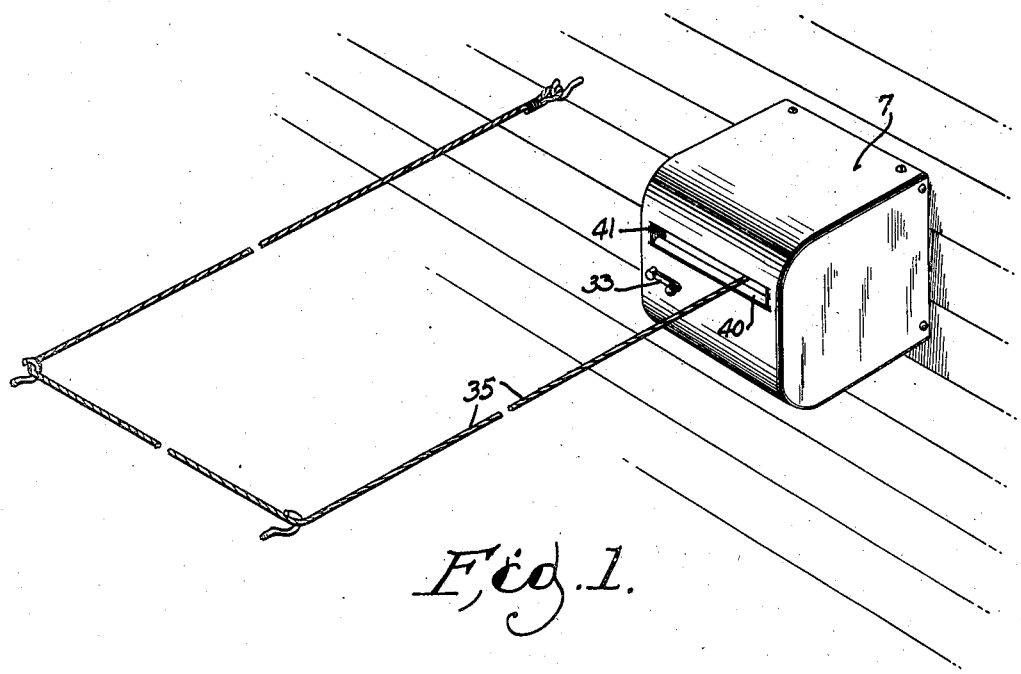
Fig. 1 is a view in perspective showing my improved reel as it appears in use.

The case or cabinet 7 comprises a shell assembled to a reel frame which includes a mounting plate 8 and a pair of bracket arms 9 and 10. The bracket arm 10 extends transversely at 11 and rearwardly at 12. The arm portion 12 and the arm portion 9 provide bearings for the reel shaft 13 to which is attached, by means of pin 14, the hub 15 of the reel 16.

The motor shaft 17 is fixed, by means of pin 18, in the bracket arm 10 in line with the reel shaft 13 in which its end portion 19 is piloted.

In order to provide sufficient spring capacity to rewind substantial lengths of line on the reel 16, I prefer to use a number of spring motors in sequence. I have found phonograph motors to be particularly suitable for this purpose. Three phonograph motors 20 are connected in series in the embodiment illustrated.

Each such phonograph motor 20 conventionally comprises a hub 21 to which the inner end of the volute clock spring 22 is connected at 23. The outer end of spring 22 is connected at 24 to the closed shell 25 which is mounted to revolve upon the hub. The shell 25 of the first motor is, for the purposes of the present invention, riveted to a flange 26 on the reel shaft 13, while the hub 21 of the first motor is provided at 27 with a jaw clutch in engagement with the hub 21 of the second spring motor. The second spring motor is identical with the first except that the spring should be wound oppositely because the second and third spring motors have their respective shells 25 connected to a common back plate 28. The hub of the third spring motor is pinned to the stationary shaft 17 at 171 which, as already noted, is fixed to the bracket. Thus, the several motors are connected in series to provide sufficient spring capacity for reeling in a very considerable length of line without employing the use of gears and without raising the torque at any time to an unduly high value.

Figures 5, 6:
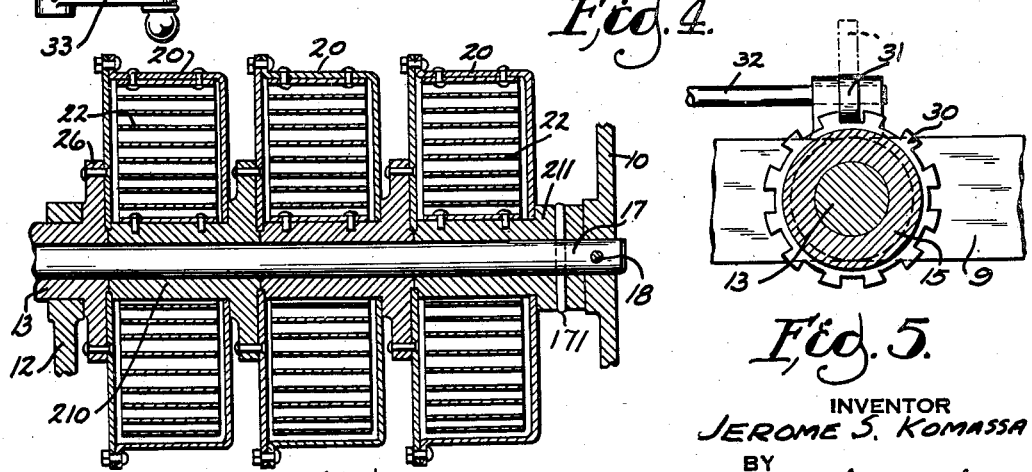
Fig. 5 is a fragmentary detail view taken in transverse section on the line 5—5 of Fig. 4.
Fig. 6 is a view fragmentarily illustrating a modified embodiment in which the spring motors have a different series connection from that shown in Fig. 4.

Fig. 6 shows an alternative arrangement in which the shell 20 of the first motor is connected exactly as above described but each of the first and second motors has a flanged hub 210 connected with the shell of the next motor in the series the hub of the last motor being identified by reference character 211. Where this arrangement is used, the successive springs may all be wound in the same direction.

In both constructions the several series-connected spring motors are housed within one end of the drum or reel 16 at one side of the web 29 which supports the reel from its hub 15.

Figure 4:
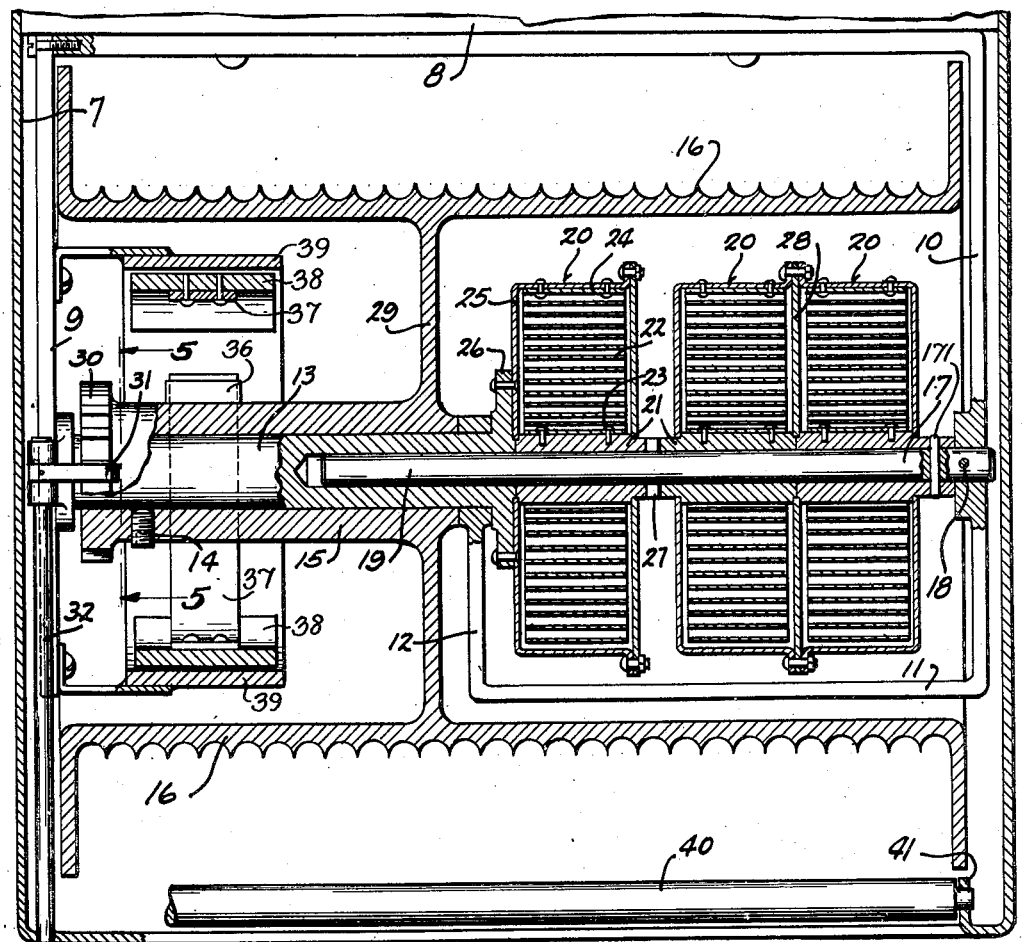
Fig. 4 is an enlarged detail view taken in horizontal section through the entire mechanism.

Within the reel, at the other side of the web 29, I prefer to provide both a positive lock and a governor brake. The reel hub 15 is provided at 30 with square cut teeth (Figs. 4 and 5) with which the dog 31 is engageable and disengageable by oscillation of the rock shaft 32 which, at the front of the cabinet, is provided with a crank 33 for its manual operation. This dog is preferably positive so that, when it is engaged, the reel cannot rotate in either direction. When the line 35 is drawn out for use as shown in Figs. 1 and 3, the handle 33 may be adjusted to locking position so that, regardless of the weight imposed on the line, no further line will be paid out by the reel.

The hub 15 also carries anchorage bosses 36 from which springs 37 carry brake shoes 38 in proximity to the stationary drum 39 supported from bracket arm 9. The springs 37 are resiliently flexible and, as shown in Fig. 3, are volute in a direction which is clockwise from the hub to the outer end of the arms. The bias of the arms normally holds the shoes free of the drum. However, if the operator accidentally releases the line, the resulting acceleration of the reel, as a result of the action of the spring motors therein, will throw the shoes 38 centrifugally into engagement with the drum and the resulting friction will tend to cause the shoes to lag with reference to the moving hub 15, thereby increasing the bias of the springs 37, with the result that the frictional pressure of the shoes against the drum will be sharply increased progressively, thus bringing the reel to a halt and allowing the operator to recapture the line. If the line is paid in at a rate which is not excessive, the spring motors will actuate the reel to wind the line without any braking action such as above described.

To guide the line 35 as it is fed in or out of the case or cabinet 7, I may provide one or more rollers 40 (Figs. 3 and 4) which may be journalled in lugs 41 inwardly turned at the ends of the slot and integral with the casing.

Figures 2, 3:
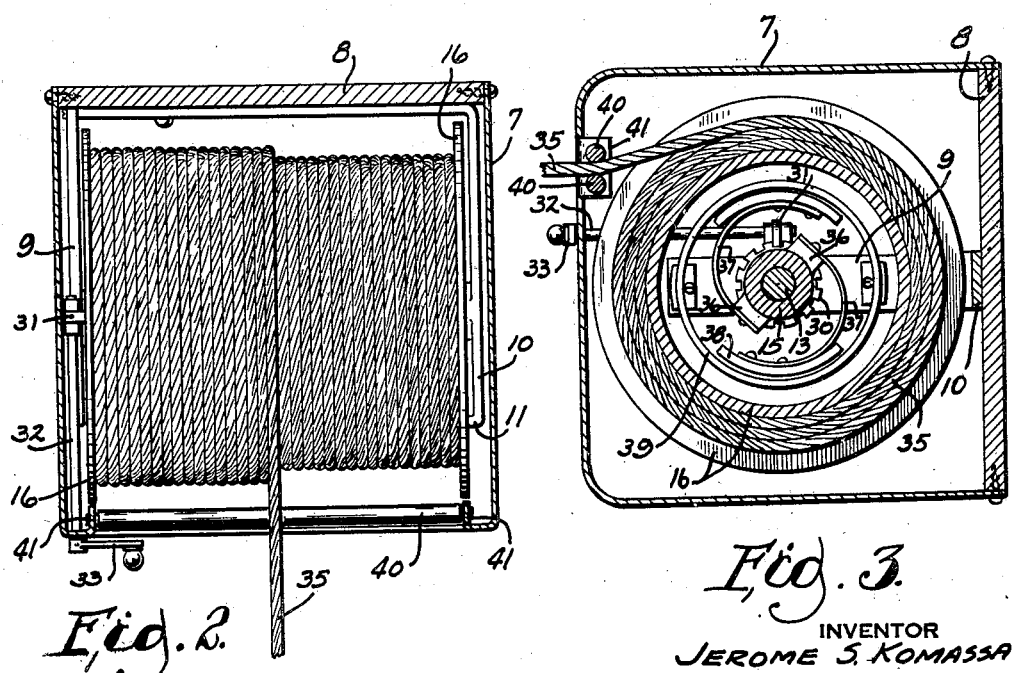
Fig. 2 is a view taken in horizontal section through the reel case, showing the partially filled reel in plan.
Fig. 3 is a view taken in transverse section through the reel case.

In use, my improved reel may either be fastened externally to existing buildings as shown in Fig. 1, or may be built into the wall of a building. With the latter possibility in view, the control lever 33 has been located on the front of the cabinet 7.

In all routine uses of the device, the brake lock will remain inoperative but at any time when the rewinding speed of the reel becomes excessive, the brake lock will function to retard or stop reel rotation. The positive lock stops rotation in either direction and is ordinarily applied only when the desired length of line has been paid out.

By using a series of volute springs connected in sequence, I am able to pay out a very substantial length of line without building up undue spring torque and I am able to rewind a substantial length of line with adequate torque.

It will be noted that by housing both the spring motors and brake and lock mechanism within the reel, I am able to employ a reel which has a maximum of capacity of line in relation to the size of the storage cabinet. The reel substantially fills the space between the brackets, about which the cabinet is closely fitted. It will be apparent that for many purposes the cabinet may be removed.

I claim:

1. The combination with a mounting bracket comprising three aligned supports, of a reel shaft rotatable between two of said supports and an aligned motor shaft extending between one of the reel shaft supports and the third support, a reel encircling said shafts and provided with means carrying it from said reel shaft for rotation, a set of volute spring motors certain of which have rotatable portions mounted on said motor shaft, said spring motors being provided with means connecting them in series between said motor shaft and reel, said spring motors being housed within said reel.

2. The device of claim 1 in which the motor shaft has a bearing in the reel shaft.

3. The device of claim 1, in which said supports comprise remotely spaced bracket arms providing the outermost of said supports, a lateral extension of one of said arms having an inwardly turned end providing an intermediate support.

4. The combination with a bracket comprising spaced arms, of a lateral extension on one of said arms having an inwardly turned end, a reel shaft rotatably mounted in said end and in one of said bracket arms, a motor shaft mounted in the other of said bracket arms and supported by said end, a tubular reel operatively mounted for rotation on the reel shaft and surrounding both of said shafts, a set of volute spring motors connected in series between the reel and the motor shaft, at least one of said motors comprising means rotatable upon the motor shaft, and a positive lock including a part mounted on one of said arms and a part connected with said reel, one of said parts being manually operable into engagement and disengagement respecting the other.

5. The combination set forth in claim 4, in further combination with a cabinet enclosing said arms and reel, and means operable from the front of said cabinet for engaging and disengaging said lock parts.

6. The combination set forth in claim 4, in further combination with a brake drum mounted on one of said shafts within the reel and brake shoes provided with yieldable mountings from said reel and operatively disposed within the drum for centrifugal engagement therewith in response to excessive rates of reel rotation.

7. The combination set forth in claim 4, in further combination with a brake drum mounted on one of said shafts within the reel and brake shoes provided with yieldable mountings from said reel and operatively disposed within the drum for centrifugal engagement therewith in response to excessive rates of reel rotation, said yieldable supports comprising volute springs pitched in the direction of winding rotation of the reel whereby to automatically increase the bias of said springs when said shoes engage said drum in the course of a winding reel motion.

8. In a device of the character described, the combination with a housing and a fixed shaft mounted therein, of a reel hub rotatively mounted to turn about the fixed shaft and having one end disposed in proximity to a given portion of said housing, a web connected with the other end of said hub and projecting radially therefrom, a reel mounted on the web to turn with said hub and having a portion extending about said hub toward said housing portion, whereby to provide a cavity between said reel portion and hub and between said web and said housing portion, said reel being flanged, and a plurality of spring motors disposed at the other side of said web from the cavity aforesaid and operatively connected with each other in series, a spring motor remote from said web at one end of said series having an anchorage connection with said shaft, and a spring motor proximate to said web having a driving connection with said hub.

JEROME S. KOMASSA.

REFERENCES CITED

The following references are of record in the file of this patent:

UNITED STATES PATENTS

| Number | Name | Date |
|---|---|---|
| 139,484 | Talpey | June 3, 1873 |
| 727,486 | Sundin | May 5, 1903 |
| 947,482 | Deatherage | Jan. 25, 1910 |
| 1,120,341 | Smith | Dec. 8, 1914 |
| 1,153,188 | Block | Sept. 14, 1915 |
| 1,941,880 | Earll | Jan. 2, 1934 |
| 1,971,470 | Watson | Aug. 28, 1934 |
| 2,133,551 | Logan | Oct. 13, 1938 |
| 2,403,653 | Geohegan et al. | July 9, 1946 |